United States Patent [19]

Morita

[11] Patent Number: 4,756,084
[45] Date of Patent: Jul. 12, 1988

[54] GUARD FOR VEGETATION CUTTING DEVICE

[76] Inventor: Lawrence H. Morita, 20212 Big Ben La., Huntington Beach, Calif. 92646

[21] Appl. No.: 926,329

[22] Filed: Nov. 3, 1986

[51] Int. Cl.[4] ............................................. B26B 7/00
[52] U.S. Cl. ......................................... 30/276; 30/286
[58] Field of Search ................ 30/276, 347, 286, 289, 30/294, 293, 292, DIG. 5; 56/16.1, 295; 172/24

[56] References Cited

U.S. PATENT DOCUMENTS

| | | | |
|---|---|---|---|
| 620,546 | 2/1899 | Guenther | 172/24 |
| 638,119 | 11/1899 | Higgs | 172/24 |
| 1,140,952 | 5/1915 | Christensen | 30/390 |
| 1,364,825 | 1/1921 | Anderson | 172/24 |
| 2,173,771 | 9/1939 | Taylor | 47/57 |
| 2,843,033 | 4/1955 | Meyer | 97/40 |
| 2,949,944 | 8/1960 | Blachly | 30/276 |
| 3,241,302 | 3/1966 | Barry | 56/25.4 |
| 3,831,278 | 8/1974 | Voglesonger | 56/295 |
| 3,859,776 | 1/1975 | Ballas et al. | 56/295 |
| 4,049,059 | 9/1977 | Weibling | 30/276 |
| 4,285,128 | 8/1981 | Schnell et al. | 56/295 |
| 4,567,657 | 2/1986 | Krause | 30/276 |

*Primary Examiner*—Douglas D. Watts
*Attorney, Agent, or Firm*—Gordon L. Peterson

[57] ABSTRACT

A cutting device for vegetation comprising a supporting structure, a rotary cutting head adapted to have at least one strand-like cutting element extending therefrom, a motor for rotating the cutting head, an elongated guard and an arm for coupling the guard to the supporting structure.

10 Claims, 1 Drawing Sheet

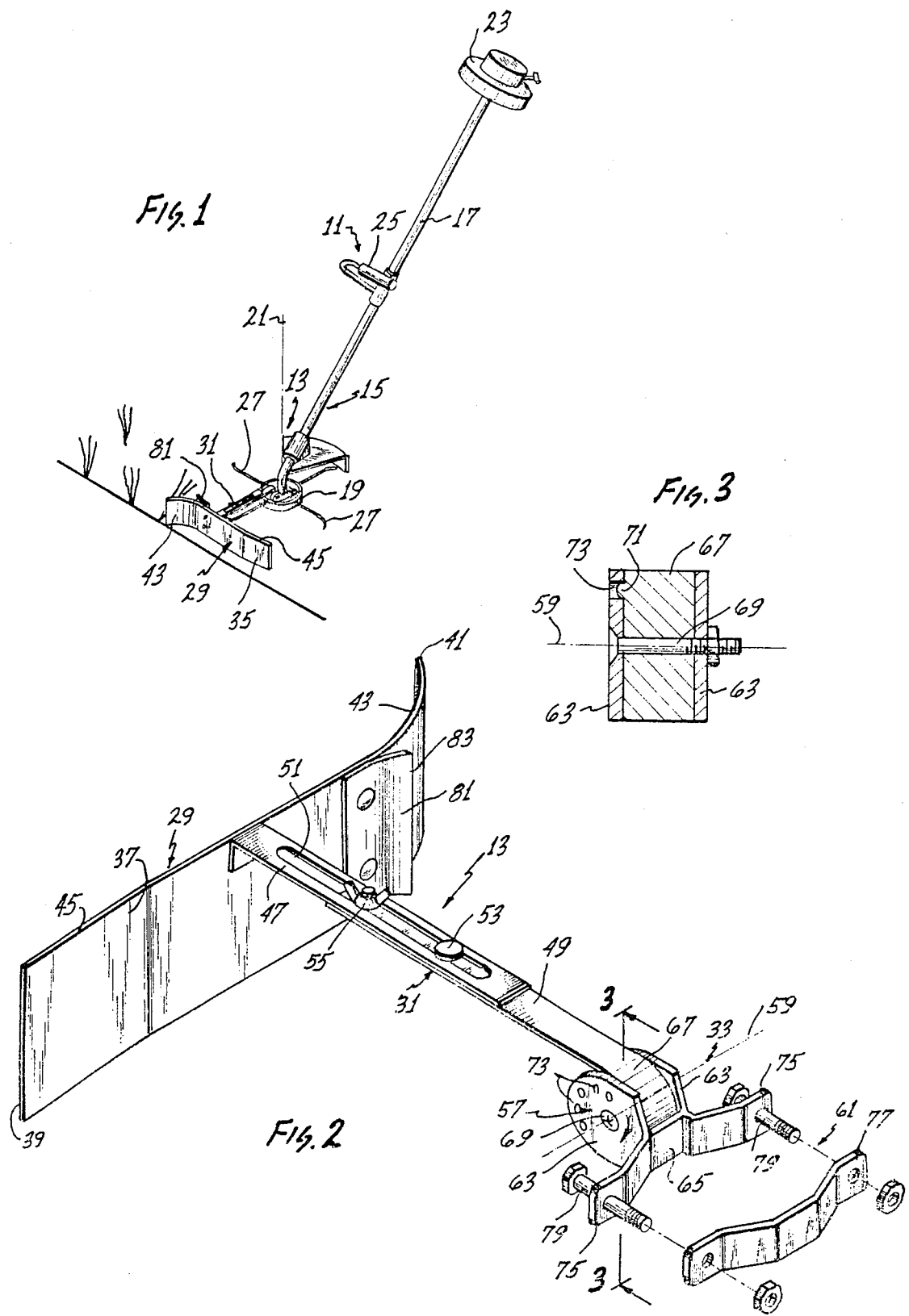

GUARD FOR VEGETATION CUTTING DEVICE

BACKGROUND OF THE INVENTION

One popular and effective cutting device for vegetation employs one or more strand-like cutting elements which are rotated by a rotary cutting head. The strand-like cutting element is plastic and is fed out from the rotary cutting head as the cutting element is used up. The rotary cutting head is mounted on a suitable supporting structure, which includes an elongated handle, and a motor rotates the cutting head and the cutting element at high velocity.

Cutting devices of this type are of light weight and can be easily manually manipulated to cut or trim various forms of vegetation, such as grass, weeds and the like. Such cutting devices are commonly used for trimming and edging.

One problem with cutting devices of this type is that the strand-like cutting element can cut or damage various objects. For example, the cutting element rotating at high speed can do significant damage to the bark or trees, flowers and plants which are not intended to be trimmed, and wooden planter boxes. Prior art hood-type guards, such as those shown in Schnell et al U.S. Pat. No. 4,285,128 and Voglesonger U.S. Pat. No. 3,831,278, which have a forwardly facing opening, are not as effective as desired in guarding objects of this type.

SUMMARY OF THE INVENTION

This invention provides a guard apparatus for a cutting device of the type described which is effective in protecting trees, planter boxes, shrubs and other objects from damage from the cutting device. This protection can be provided in a wide angular zone which preferably lies forwardly of the cutting device.

These desirable results can be obtained with a guard apparatus which includes an elongated guard, an arm coupled to the guard and means coupling the arm to the supporting structure of the cutting device. The guard is spaced radially from the rotational axis of the rotary cutting head to allow the cutting element to be rotated by the cutting head so that the guard can protect objects from being damaged by the cutting element.

Although the guard may take different forms, it preferably is in the form of a guard plate having opposite ends and inner and outer faces. So that the guard can guide the cutting device around a tree or other object to be protected, at least a portion of the guard is preferably concave and faces generally outwardly of the rotational axis. In a preferred construction, the guard has opposite end portions, and at least one of the end portions is concave as described above. The concave portion of the guard may be formed from curved and/or straight sections so long as a suitable cavity or recess is provided in the proper orientation for engaging a tree or other object to be protected.

To adapt the guard apparatus for use in various different environments, the arm is preferably of variable length. This enables the radial spacing between the rotational axis of the cutting head and the guard to be adjusted.

To provide additional flexibility, means is provided for allowing the guard to be pivoted about a pivot axis which is generally transverse to the rotational axis and means for fixing the guard in any one of a plurality of positions about such pivot axis. In a preferred construction, such means is incorporated into the means for coupling the arm to the supporting structure of the cutting device.

To enable the guard apparatus to be retrofit on existing cutting devices and to enable it to be moved from one cutting device to another, it is preferably removably coupled to the cutting device, and preferably, it is removably coupled to the handle of the cutting device. The guard may also be used to carry a blade for use in trimming the end of the cutting element.

The invention, together with additional features and advantages thereof, may best be understood by reference to the following description taken in connection with the accompanying illustrative drawing.

BRIEF DESCRIPTION OF THE DRAWING

FIG. 1 is an isometric view of a cutting device incorporating the guard apparatus of this invention.

FIG. 2 is an isometric and partially exploded view of one form of the guard apparatus.

FIG. 3 is a sectional view taken generally along line 3—3 of FIG. 2.

DESCRIPTION OF THE PREFERRED EMBODIMENT

FIG. 1 shows a cutting device 11 having a guard apparatus 13 constructed in accordance with the teachings of this invention incorporated therein. Except for the guard apparatus 13, the cutting device 11 may be conventional. The guard apparatus 13 can be used with various different cutting devices, and the cutting device 11 is purely illustrative.

Generally, the cutting device 11 includes a supporting structure 15, which in turn includes an elongated handle 17, a rotary cutting head 19 mounted on the supporting structure for rotation about a rotational axis 21 and a motor 23 at the end of the handle remote from the cutting head to drive the cutting head. The handle 17 may also include a hand grip 25 to assist in manually manipulating the cutting device.

The cutting head 19 is adapted to have one or more strand-like cutting elements 27 extend radially therefrom and radially from the rotational axis 21. The strand-like cutting elements are a thin, plastic filament that can perform the cutting, trimming or edging function in a well-known manner when rotated at a high angular velocity by the motor 23. For example, the motor 23 may rotate the cutting head 19 and the cutting elements 27 at or above 2000 rpm. The cutting element 27 is fed out from the cutting head in a well-known manner as the distal end portions of the cutting elements are used up or cut off.

Although the cutting device 11 can be used in various different orientations, it is typically used in the orientation shown in FIG. 1 in which the rotational axis 21 extends substantially vertically. Because the cutting device 11, except for the guard apparatus 13, may be conventional, it is not described in greater detail herein.

The guard apparatus 13 includes an elongated guard 29, an elongated variable length arm 31 coupled to the guard, and coupling means 33 for coupling the arm to the handle 17, with the guard being radially spaced from the rotational axis 21 to allow the cutting element 27 to be rotated by the cutting head 19. Although the guard 29 can be of different constructions, in the embodiment illustrated, it is in the form of a guard plate which has an outer face 35, an inner face 37 and opposite ends 39 and 41. The guard 29 has an end portion 43 which is curved into a part of a cylinder such that the end portion 43 is concave and faces generally outwardly of the rotational axis 21 to facilitate guiding the cutting device 11 around an object to be protected. When curved in this fashion, the outer face 35 of the end portion 43 is concave, and the inner face 37 of the end portion 43 is convex. The remainder of the guard 29 may be essentially flat, although it may be curved, if desired. In the embodiment illustrated, the guard 29 has an end portion 45 which is slightly curved in the other direction.

Although the arm 31 can be of various different constructions, in the embodiment illustrated, it includes elongated arm sections 47 and 49. The arm section 47 is coupled to a central region of the guard 29 adjacent the upper edge of the guard and has a longitudinally extending slot 51 therein. The arm section 49 is mounted on the arm section 47 for movement therealong by threaded fasteners 53 and 55 which project through the slot 51. The length of the arm 31 can be adjusted by loosening the fasteners 53 and 55, relatively longitudinally moving the arm sections 47 and 49 and then tightening of the fasteners.

The coupling means 33 includes a first coupling 57 for allowing the guard 29 to be pivoted about a pivot axis 59 which is generally transverse to the rotational axis 21, and a second coupling 61 for removably coupling the arm 31 to the handle 17. The first coupling 57 includes spaced parallel plates 63 integrally joined by a web 65, an enlarged end portion 67 on the arm 31 which is received between the plates 63 and a threaded fastener 69 for pivotally mounting the enlarged end portion 67 on the plates 63 for pivotal movement of the arm 31 about the pivot axis 59. The enlarged end portion 67 has a projection 71 (FIG. 3) which can be received within any of a plurality of holes 73 on one of the plates 63 to thereby retain or affix the arm 31 and the guard 29 in any one of a plurality of angular positions about the pivot axis 59. The plates 63 have adequate resilience to allow the guard 29 to pivot about the pivot axis 59 to move the projection 71 to the adjacent hole 73 in response to the application of sufficient force to the guard.

The second coupling 61 comprises flanges 75 integral with the plates 63, a bracket 77 and threaded fasteners 79 for releasably coupling the bracket 77 to the flanges 75 around the handle 17. The coupling 61 enables the guard apparatus 13 to be attached to, and removed from, the cutting device 11.

The guard apparatus 13 also includes a blade 81 riveted, or otherwise suitably mounted, on the inner face 37 of the guard 29. The blade 81 projects from the inner face 37 and lies between the guard 29 and the cutting head 19. The blade 81 has a cutting edge 83 for trimming the cutting elements 27 to length as the cutting element rotates.

In use, the guard apparatus 13 is attached to the handle 17 by the coupling 61. The longitudinal length of the arm 31 and the angular position of the arm and guard 29 about the pivot axis 59 are then selected. The guard 29 lies forwardly of the cutting head 19, i.e., on the side thereof opposite to the direction in which the handle 17 projects from the cutting head. The guard 29 will contact objects to be protected and prevents the cutting elements 27 from striking them as the cutting elements are rotated by the motor 23. The curved end portion 43 can be used to guide the cutting device 11 around a tree or similar object to be protected. Typically, the curved end portion 43 contacts the curved tree trunk to tend to hold the cutting device 11 at a fixed distance with respect to the tree, and the cutting device 11 can then be rotated around the tree to provide for accurate trimming without endangering the tree.

Although an exemplary embodiment of the invention has been shown and described, many changes, modifications and substitutions may be made by one having ordinary skill in the art without necessarily departing from the spirit and scope of this invention.

I claim:

1. In a cutting device for vegetation such as grass, weeds and the like which includes a supporting structure, a rotary cutting head adapted to have at least one strand-like cutting element extending from the cutting head, means for mounting the cutting head on the supporting structure for rotation about a rotational axis, a motor on the supporting structure for rotating the cutting head and wherein the supporting structure includes an elongated handle to permit the cutting device to be manually manipulated so that the cutting element can cut the vegetation, the improvement comprising:

an elongated guard;
   an arm coupled to said guard;
   means for coupling the arm to the supporting structure with the guard being spaced radially from the rotational axis to allow the cutting element to be rotated by the cutting head whereby the guard can protect objects from being damaged by the cutting element;
   the coupling means removably couples the arm to the handle, said arm including means for varying the length of said arm so that the radial spacing between the rotational axis and the guard can be adjusted; and
   means for allowing the guard to be pivoted about a pivot axis which is generally transverse to said roational axis and means for fixing the guard in any one of a plurality of positions about said pivot axis.

2. A guard apparatus for a cutting device for vegetation comprising;

an elongated guard plate having opposite ends and outer and inner faces;
   an elongated arm coupled to the guard plate intermediate the ends of the guard plate and extending generally transversly from the guard plate away from said inner face;
   means for removably coupling the arm to the cutting device;
   a blade carried by the guard plate and projecting from said inner face; and
   said arm including means for varying the length of said arm, said outer face having opposite end portions and one of said end portions of the outer face being concave.

3. An improvement as defined in claim 1 wherein at least a portion of said guard is concave and faces generally outwardly of the rotational axis to facilitate guiding the cutting device around an object to be protected.

4. An improvement as defined in claim 3 wherein said guard has opposite end portions and at least one of said end portions is concave and faces generally outwardly of the rotational axis to facilitate guiding the cutting device around an object to be protected.

5. an improvement as defined in claim 1 wherein said guard includes an elongated plate having opposite end portions, one of said end portions is concave and faces generally outwadly of the rotational axis and the remainder of said plate is generally flat.

6. An improvement as defined in claim 1 including a blade carried by said guard between the guard and the cutting head.

7. An improvement as defined in claim 1 wherein said guard has opposite end portions and at least one of said end portions is concave and faces generally outwardly of the rotational axis to facilitate guiding the cutting device around an object to be protected.

8. A guard apparatus as defined in claim 2 wherein said coupling means includes means for pivotally mounting the arm on the cutting device.

9. A device as defined in claim 1 wherein the guard is spaced forwardly of the rotational axis and is elongated in a nonradial direction which is generally transverse to the rotational axis.

10. An improvement as defined in claim 1 wherein said arm includes first and second arm sections and said means for varying includes means for coupling said arm sections together so that the length of said arm can be adjusted.

* * * * *